United States Patent
Zhang

(10) Patent No.: US 12,229,943 B2
(45) Date of Patent: Feb. 18, 2025

(54) METHOD AND APPARATUS FOR ACQUIRING IMAGES, AND STORAGE MEDIUM THEREOF

(71) Applicants: Chengdu BOE Optoelectronics Technology Co., Ltd., Sichuan (CN); BOE Technology Group Co., Ltd., Beijing (CN)

(72) Inventor: Guolin Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/771,764

(22) PCT Filed: May 25, 2021

(86) PCT No.: PCT/CN2021/095789
§ 371 (c)(1),
(2) Date: Apr. 25, 2022

(87) PCT Pub. No.: WO2022/246643
PCT Pub. Date: Dec. 1, 2022

(65) Prior Publication Data
US 2024/0169511 A1  May 23, 2024

(51) Int. Cl.
*G06K 9/00* (2022.01)
*G06T 7/00* (2017.01)
*G06T 7/73* (2017.01)

(52) U.S. Cl.
CPC ............... *G06T 7/001* (2013.01); *G06T 7/73* (2017.01)

(58) Field of Classification Search
CPC .................. G06T 7/001; G06T 7/73
See application file for complete search history.

(56) References Cited

U.S. PATENT DOCUMENTS

| 2007/0092128 A1* | 4/2007 | Noy | ........ H05K 3/225 |
| | | | 382/145 |
| 2013/0037526 A1* | 2/2013 | Noy | ........ H05K 3/225 |
| | | | 219/121.11 |

(Continued)

FOREIGN PATENT DOCUMENTS

| CN | 102189331 A | * | 9/2011 | .......... G01N 21/956 |
| CN | 107507571 A | * | 12/2017 | .......... G09G 3/3233 |

(Continued)

OTHER PUBLICATIONS

Automatic surface defect detection for mobile phone screen glass based on machine vision, Chuanxia Jian et al., Elsevier, 2017, pp. 348-358 (Year: 2017).*

(Continued)

*Primary Examiner* — Jayesh A Patel
(74) *Attorney, Agent, or Firm* — IPro, PLLC

(57) ABSTRACT

Provided is a method for acquiring images. The method includes: acquiring a first image embodying a display panel; determining repair indication information of a plurality of defects in the display panel in the first image, wherein the repair indication information indicates a degree of a repair demand for the defects; selecting a target defect from the plurality of defects based on the repair indication information of the plurality of defects; and acquiring a repair reference image embodying the target defect by photographing the target defect in the display panel.

9 Claims, 4 Drawing Sheets

(56) References Cited

U.S. PATENT DOCUMENTS

| | | | | |
|---|---|---|---|---|
| 2019/0287231 A1* | 9/2019 | Lee | ......................... | G01N 21/93 |
| 2020/0005141 A1* | 1/2020 | Ambikapathi | ......... | G06N 20/00 |
| 2020/0126203 A1* | 4/2020 | Lee | ......................... | G06T 7/001 |
| 2021/0216062 A1* | 7/2021 | Hsiao | ................. | G05B 19/4183 |

FOREIGN PATENT DOCUMENTS

| | | | | | |
|---|---|---|---|---|---|
| CN | 108663835 A | * | 10/2018 | | |
| CN | 109001208 A | | 12/2018 | | |
| CN | 109118482 A | * | 1/2019 | ........... | G06T 7/0004 |
| CN | 111563889 A | | 8/2020 | | |
| CN | 112184667 A | | 1/2021 | | |
| JP | 09101236 A | * | 4/1997 | | |
| JP | 2007192983 A | * | 8/2007 | | |
| JP | 5217841 B2 | * | 6/2013 | | |
| WO | WO-0122070 A1 | * | 3/2001 | ....... | G01N 21/95607 |
| WO | 2010109856 A1 | | 9/2010 | | |
| WO | WO-2017071508 A1 | * | 5/2017 | ............. | G01N 21/88 |

OTHER PUBLICATIONS

Combination of Convolutional and Generative Adversarial Networks for Defect Image Demoiréing of Thin-Film Transistor Liquid-Crystal Display Image, Hsueh-Ping Lu et al., IEEE, Aug. 2020, pp. 413-423 (Year: 2020).*
A Review and Analysis of Automatic Optical Inspection and Quality Monitoring Methods in Electronics Industry, Abd Al Rahman M. Abu Ebayyeh et al., IEEE, 2020, pp. 183192-183271 (Year: 2020).*
Display panel electrode defect classification system, Behrouz N. Shabestari,et al., SPIE, 1994, pp. 1-6 (Year: 1994).*
Defect Identification and Classification for Plasma Display Panels, Du-Hyung Cho et al., AMR, 2013, pp. 694-697 (Year: 2013).*

\* cited by examiner

METHOD AND APPARATUS FOR ACQUIRING IMAGES, AND STORAGE MEDIUM THEREOF

CROSS-REFERENCE TO RELATED APPLICATION

The present disclosure is a U.S. national phase application based on PCT/CN2021/095789, filed on May 25, 2021, which is incorporated herein by reference in its entirety.

TECHNICAL FIELD

The present disclosure relates to the field of display technologies, and in particular, relates to a method and apparatus for acquiring images, and a storage medium thereof.

BACKGROUND

At present, a display panel is usually manufactured by complex technological procedures. In the manufacturing procedure of the display panel, a circuit of the display panel is prone to open circuit or short circuit.

Therefore, upon each process in the manufacturing procedure of the display panel, an automatic optical inspection (AOI) system is required to detect a defect in the display panel. Upon detecting the defect in the display panel, the AOI system further needs to photograph the display panel to acquire a repair reference image embodying the defect. Subsequently, maintenance personnel can repair the display panel according to the image, to greatly improve a product yield of display panels.

SUMMARY

Embodiments of the present disclosure provide a method and apparatus for acquiring images, and a storage medium thereof, to improve a currently low yield of display panels. The technical solutions are as follows:

According to one aspect, a method for acquiring images is provided.

The method includes: acquiring a first image embodying a display panel; determining repair indication information of a plurality of defects in the display panel in the first image, wherein the repair indication information indicates a degree of a repair demand for the defects; selecting a target defect from the plurality of defects based on the repair indication information of the plurality of defects; and acquiring a repair reference image embodying the target defect by photographing the target defect in the display panel.

Optionally, the repair indication information includes at least one of location information and defect type information.

Optionally, the repair indication information includes the location information; and selecting the target defect from the plurality of defects based on the repair indication information of the plurality of defects includes: determining a defect in a specified region of the display panel as the target defect based on the location information of the plurality of defects.

Optionally, the specified region includes at least one of a region, where a transistor is disposed, in the display panel, an intersection region of two signal cables, and a connection region of two connected electrodes.

Optionally, the repair indication information includes the defect type information; and selecting the target defect from the plurality of defects based on the repair indication information of the plurality of defects includes: determining a defect of a specified defect type as the target defect based on the defect type information of the plurality of defects.

Optionally, the determining a defect of a specified defect type as the target defect based on the defect type information of the plurality of defects includes: acquiring first defect features of the plurality of defects by feature extraction on the plurality of defects in the first image, wherein the first defect features indicate the defect type information of the defects; and selecting the target defect from the plurality of defects by comparing each of the first defect features acquired by feature extraction with a second defect feature, wherein the second defect feature indicates defect type information of the defect of the specified type.

Optionally, selecting the target defect from the plurality of defects by comparing each of the first defect features acquired by feature extraction with the second defect feature includes: determining a similarity between each of the first defect features and the second defect feature; and determining a defect corresponding to a first defect feature with a similarity greater than a similarity threshold as the target defect.

Optionally, the repair indication information includes the location information and the defect type information; and selecting the target defect from the plurality of defects based on the repair indication information of the plurality of defects includes: determining, based on the location information of the plurality of defects, a defect in a specified region of the display panel in the plurality of defects as a defect to be selected; and determining, in a plurality of defects to be selected and based on defect type information of the defect to be selected, a defect of a specified defect type as the target defect.

Optionally, acquiring the repair reference image embodying the target defect by photographing the target defect in the display panel includes: acquiring a second image embodying the display panel; and acquiring the repair reference image by capturing, based on location information of the target defect, an image embodying the target defect from the second image.

According to another aspect, an apparatus for acquiring images is provided.

The apparatus includes: an acquiring module, configured to acquire a first image embodying a display panel; a determining module, configured to determine repair indication information of a plurality of defects in the display panel in the first image, wherein the repair indication information indicates a degree of a repair demand for the defects; a selecting module, configured to select a target defect from the plurality of defects based on the repair indication information of the plurality of defects; and a photographing module, configured to acquire a repair reference image embodying the target defect by photographing the target defect in the display panel.

Optionally, the repair indication information includes location information; and the selecting module is configured to determine a defect in a specified region of the display panel as the target defect based on the location information of the plurality of defects.

Optionally, the repair indication information includes defect type information; and the selecting module is configured to determine a defect of a specified defect type as the target defect based on the defect type information of the plurality of defects.

Optionally, the repair indication information includes location information and defect type information, and the selecting module is configured to: determine, based on the location information of the plurality of defects, a defect in a specified region of the display panel in the plurality of defects as a defect to be selected; and determine, in a plurality of defects to be selected and based on defect type information of the defect to be selected, a defect of a specified defect type as the target defect.

Optionally, the photographing module is configured to acquire a second image embodying the display panel; and acquire the repair reference image by capturing, based on location information of the target defect, an image embodying the target defect from the second image.

According to still another aspect, a computer-readable storage medium storing one or more instructions therein is provided. The computer-readable storage medium, when running on a processing component, causes the processing component to perform the method for acquiring images as described above.

The technical solutions according to the embodiments of the present disclosure achieve at least the following beneficial effects:

The repair indication information of a plurality of defects in the display panel is acquired, the target defect is selected from the plurality of defects based on the repair indication information, and the repair reference image embodying the target defect is subsequently acquired. A repair reference image embodying all defects in the display panel does not need to be acquired, such that an AOI system has high detection efficiency for the display panel, ensuring a larger production capacity of the display panel. In addition, a probability that the target defect selected based on the repair indication information needs to be repaired is higher, and a probability that other defects that are not selected need to be repaired is lower. This effectively improves accuracy of the AOI system in acquiring the repair reference image and achieves a higher yield of the display panels.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION OF THE EMBODIMENTS

For clearer descriptions of the objectives, technical solutions and advantages of the present disclosure, the embodiments of the present disclosure are described hereinafter in detail with reference to the accompanying drawings.

Figure 1:
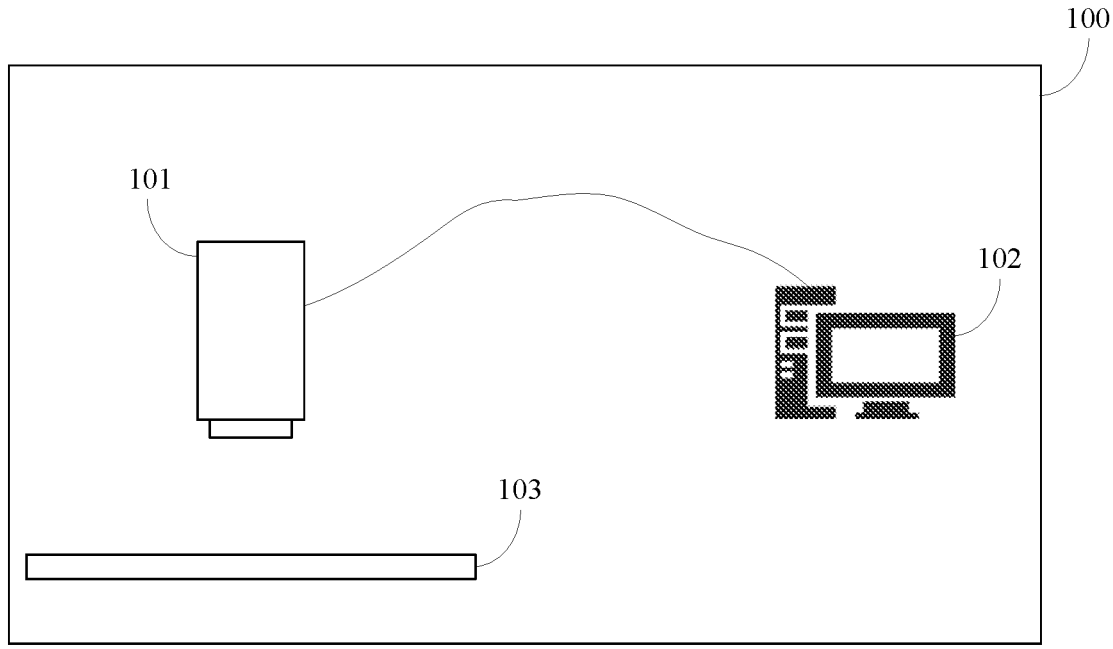
FIG. 1 is a schematic diagram of a structure of an AOI system related to a method for acquiring images according to an embodiment of the present disclosure.

FIG. 1 is a diagram of a structure of an AOI system related to a method for acquiring images according to an embodiment of the present disclosure. The AOI system 100 may include an image acquisition device 101 and a processing device 102.

The image acquisition device 101 is configured to acquire an image of a display panel 103. In this way, in a manufacturing procedure of the display panel 103, images of the display panel 103 upon each process can be acquired by the image acquisition device 101.

The processing device 102 may be a computer device, a server, a server cluster consisting of several servers, a cloud computing service center, or the like.

The image acquisition device 101 is communicatively connected to the processing device 102. The image acquisition device 101 can send the acquired image to the processing device 102. It should be noted that the communicative connection in the embodiment of the present disclosure may be a communicative connection established over a wired network or a wireless network.

For example, the image acquisition device 101 can acquire a grayscale image and a color image embodying the display panel 103. The processing device 102 can complete a process of detecting defects in the display panel based on the grayscale image and can also complete a process of acquiring a repair reference image of the defects based on the color image.

In the related art, upon detecting the defects in the display panel, the AOI system further needs to acquire a repair reference image embodying each defect by photographing each defect in the display panel. However, the number of defects detected by the AOI system is large (usually hundreds of defects can be detected). It takes a long time for the AOI system to acquire a repair reference image of the defects. In addition, some defects in the display panel detected by the AOI system do not need a repair for these defects will not affect normal display of the display panel. Therefore, in the case that the AOI system needs to acquire a repair reference image of all the defects in the display panel, detection efficiency of the AOI system for the display panel is inevitably lowered, causing a lower production capacity of the display panel.

For example, in the case that each display panel has 50 defects, the AOI system may detect 22,000 display panels per month; in the case that each display panel has 100 defects, the AOI system may only detect 17,000 display panels per month.

At present, for improvement of detection efficiency of the AOI system for the display panel, in the case that the AOI system acquires all the defects in the display panel, it is necessary to randomly select a specified quantity of defects (for example, 20 defects) from the defects, and to acquire a repair reference image embodying the selected defects by photographing the selected defects.

However, in the case that the defects are selected randomly, some defects that may affect a display effect of the display panel may not be selected, and then the defects may not be repaired subsequently. However, some defects that may not affect the display effect of the display panel may be selected. Therefore, accuracy of the AOI system in acquiring the repair reference image is low, causing a low yield of the display panel.

Figure 2:
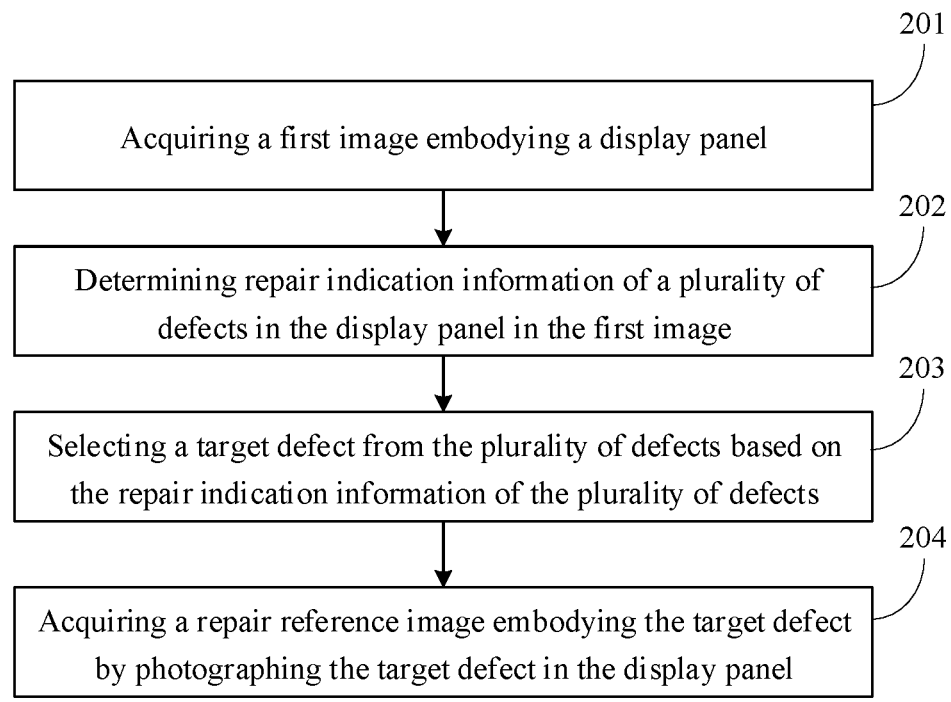
FIG. 2 is a flowchart of a method for acquiring images according to an embodiment of the present disclosure.

FIG. 2 is a flowchart of a method for acquiring images according to an embodiment of the present disclosure. This method is applicable to the processing device 102 in the AOI system 100 shown in FIG. 1. The method may include the following steps.

In step 201, a first image embodying a display panel is acquired.

In step 202, repair indication information of a plurality of defects in the display panel in the first image is determined. The repair indication information indicates a degree of a repair demand for the defects.

In step 203, a target defect is selected from the plurality of defects based on the repair indication information of the plurality of defects.

In step 204, the target defect in the display panel is photographed to acquire a repair reference image embodying the target defect.

In summary, in the method for acquiring images according to the embodiment of the present disclosure, the repair indication information of a plurality of defects in the display panel is acquired, the target defect is selected from the plurality of defects based on the repair indication information, and the repair reference image embodying the target defect is subsequently acquired. A repair reference image embodying all defects in the display panel does not need to be acquired, such that an AOI system has high detection efficiency for the display panel, ensuring a larger production capacity of the display panel. In addition, a probability that the target defect selected based on the repair indication information needs to be repaired is higher, and a probability that other defects that are not selected need to be repaired is lower. This effectively improves accuracy of the AOI system in acquiring the repair reference image and achieves a higher yield of the display panels.

Figure 3:
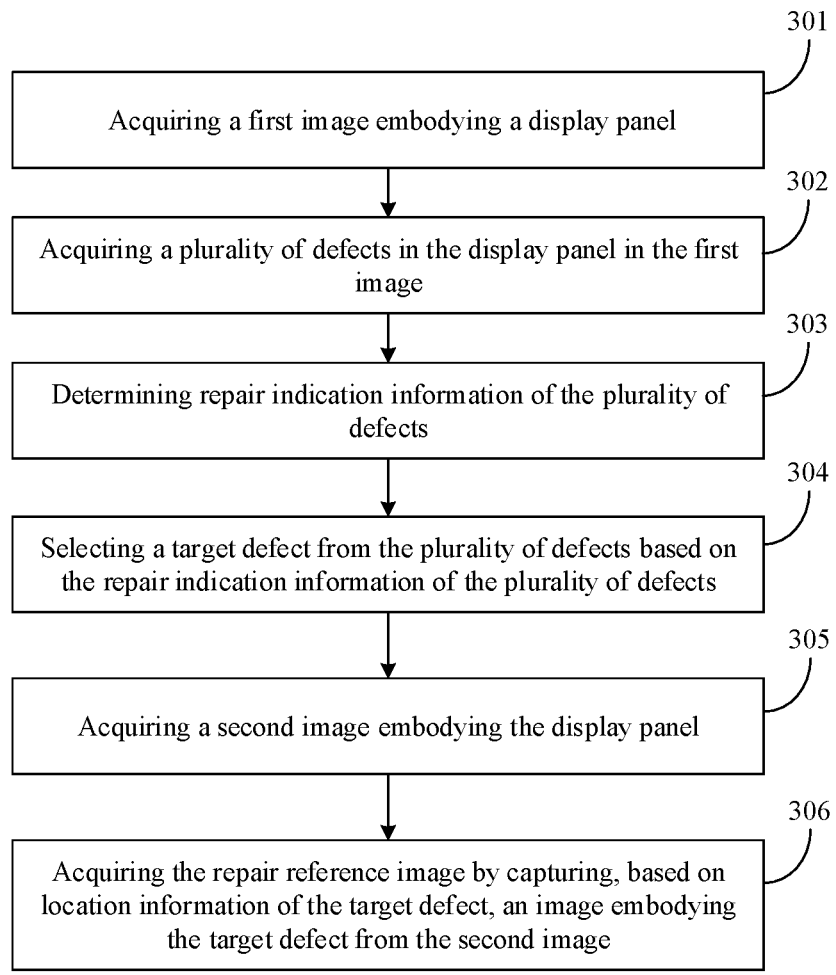
FIG. 3 is a flowchart of another method for acquiring images according to an embodiment of the present disclosure.

FIG. 3 is a flowchart of another method for acquiring images according to an embodiment of the present disclosure. The method is applicable to the processing device 102 in the AOI system 100 shown in FIG. 1. The method includes the following steps.

In step 301, a first image embodying a display panel is acquired.

In the embodiment of the present disclosure, the processing device may acquire the first image embodying the display panel.

In the present disclosure, in a manufacturing procedure of the display panel, an image acquisition device in the AOI system can acquire the first image of the display panel upon each process. In addition, the AOI system can send the first image embodying the display panel acquired by the AOI system to the processing device so that the processing device can acquire the image embodying the display panel. It should be noted that, to facilitate subsequent detection of defects in the display panel in the first image, the first image is usually a grayscale image. Therefore, the image acquisition device may include a scanning camera by which a first image acquired is a grayscale image.

For example, upon each process in the manufacturing procedure of the display panel, the display panel may be loaded on a bearing base in the AOI system. The display panel on the bearing base is aligned by using a robotic arm in the AOI system, to ensure that the image acquisition device can be right opposite to the display panel. Then, the first image embodying the display panel can be acquired by the scanning camera in the image acquisition device.

It should be noted that upon acquiring the first image embodying the display panel, the image acquisition device can send the acquired image to a storage server so that the storage server can store the first image embodying the display panel. Subsequently, where it is necessary to detect defects in the display panel upon a specific process, the processing device downloads the corresponding first image from the storage server and detects the defects in the display panel in the first image.

In step 302, a plurality of defects in the display panel in the first image are acquired.

In the embodiment of the present disclosure, upon acquiring the first image embodying the display panel, the processing device may further acquire the plurality of defects in the display panel in the first image.

For example, the processing device may acquire the plurality of defects in the display panel in the first image by periodic comparison. For example, in a region to be detected in the first image, comparison is performed between an average value of grayscale values of the first row of 20 pixels and an average value of grayscale values of the second row of 20 pixels, to determine whether a difference is within a preset range. In the case that the difference is within the preset range, the grayscale values of the first row of 20 pixels or the grayscale values of the second row of 20 pixels are relatively balanced, and there is no pixel with sudden change in grayscale value. Therefore, it can be determined that there is no defect in the region to be detected; and otherwise, it is determined that the region to be detected has defects.

In step 303, repair indication information of the plurality of defects is determined.

In the embodiment of the present disclosure, upon acquiring the plurality of defects in the display panel in the first image, the processing device may further acquire the repair indication information of the plurality of defects. The repair indication information indicates a degree of a repair demand for the defects. For a defect that will affect a display effect of the display panel, a degree of a repair demand for the defects is high, and a repair probability is high; for a defect that does not affect the display effect of the display panel, a degree of a repair demand for the defects is low, and a repair probability is low. It should be noted that the processing device needs to acquire repair indication information of each of the plurality of defects.

In the present disclosure the indication information of the defect in the display panel may include at least one of location information of the defect and defect type information.

In step 304, a target defect is selected from the plurality of defects based on the repair indication information of the plurality of defects.

In the embodiment of the present disclosure, upon acquiring the repair indication information of the plurality of defects, the processing device may select the target defect from the plurality of defects based on the repair indication information of the plurality of defects. The target defect is a defect that will affect the display effect of the display panel, and a degree of a repair demand for the target defect is high.

In the present disclosure, there are many types of repair indication information of defects, and for different types of repair indication information, the target defect may be selected from the plurality of defects in different ways. In view of this, the present disclosure provides an exemplary description of selecting the target defect by the following three examples:

In a first example, the repair indication information of the defects includes the location information of the defects. The location information of the defect indicates a location of the defect in the display panel. Step 304 in this case may include determining a defect in a specified region of the display panel as the target defect based on the location information of the plurality of defects.

In the embodiment of the present disclosure, the specified region of the display panel is artificially predetermined. For example, the specified region may include at least one of a region, where a transistor is disposed, in the display panel, an intersection region of two signal cables, and a connection region of two connected electrodes. A probability that a defect in these specified regions affects normal display of the display panel is high.

In view of this, the processing device may determine a defect in the specified region of the display panel as the target defect based on the location information of the plurality of defects. In the plurality of defects, the target defect in the specified region has a higher probability of being repaired, and a repair reference image embodying the target defect can be acquired subsequently; while other defects outside the specified region in the plurality of defects have a low probability of affecting normal display of the display panel, and a repair probability is also low. Therefore, the repair reference image embodying these defects does not need to be subsequently acquired.

Figure 4:
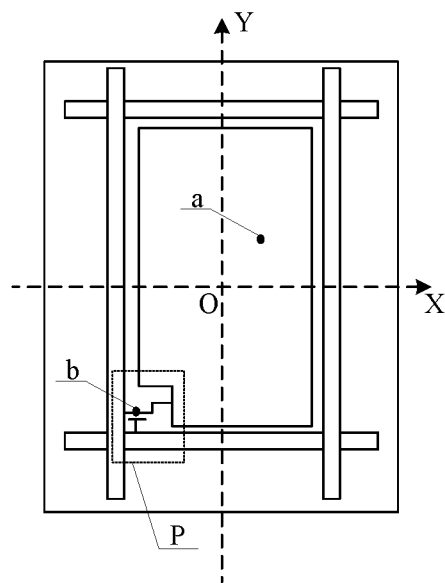
FIG. 4 is an effect diagram of defects in a display panel according to an embodiment of the present disclosure.

As shown in FIG. 4, FIG. 4 is an effect diagram of defects in the display panel according to an embodiment of the present disclosure. Upon acquiring the first image, the processing device determines a point expressed by coordinates of each pixel in the first image in a specific coordinate system. For example, an origin of the coordinate system may coincide with a center point of the first image, an X-axis of the coordinate system is parallel to a width direction of the first image, and a Y-axis of the coordinate system is parallel to a length direction of the first image. Since a location of a specified region P in the first image is fixed, a position of the specified region P in the coordinate system is also fixed. When the location information of the defect in the display panel in the first image is represented by the point expressed by coordinates in the coordinate system, it is possible to determine whether the defect is in the specified region P based on a relationship between the point expressed by coordinates of the defect in the coordinate system and each point expressed by coordinates in the specified region P. For example, in FIG. 4, in response to determining that a defect a is outside the specified region P and a defect b is within the specified region P, the processing device may determine the defect b as the target defect.

In a second example, the repair indication information of the defect includes the defect type information of the defect. The defect type information of the defect indicates a type of the defect. For example, the defect type may include foreign body residue, film swelling, film rupture, film shedding, film missing, a broken wire, a short circuit, or the like. Step 304 in this case may include determining a defect of a specified defect type as the target defect based on the defect type information of the plurality of defects.

In the embodiment of the present disclosure, different types of defects have different effects on the display effect of the display panel. The defect of the specified type may be a defect that is artificially predetermined and has a strong effect on the display effect of the display panel. For example, the defect of the specified type may include at least one of film shedding, film missing, a broken wire, and a short circuit.

In view of this, the processing device may determine the defect of the specified defect type as the target defect based on the defect type information of the plurality of defects. In the plurality of defects, the target defect of the specified defect type has a higher probability of being repaired, and a repair reference image embodying the target defect can be acquired subsequently; while other defects of other types than the specified defect type in the plurality of defects have a low probability of affecting normal display of the display panel, and a repair probability is also low. Therefore, the repair reference image embodying these defects does not need to be subsequently acquired.

For example, the processing device determines the defect of the specified defect type as the target defect based on the defect type information of the plurality of defects may include the following several steps.

In step A, feature extraction is performed on the plurality of defects in the first image to acquire first defect features of the plurality of defects.

In the embodiment of the present disclosure, the processing device may perform feature extraction on each of the defects in the first image to acquire the first defect features of the plurality of defects.

The first defect features are used to represent defect type information of the defects, which may include grayscale information and boundary information of displayed content in the image, and the like. The defect feature may be an array or a vector.

For example, when the defect feature includes the boundary information of the displayed content in the image, the processing device may acquire the boundary information by: performing smooth processing on the image by using a Gaussian filter; calculating an amplitude and a direction of a gradient by using a finite difference of a first-order partial derivative; performing non-maximum suppression on the amplitude of the gradient; and detecting and connecting edges by a double threshold algorithm.

In an optional embodiment, feature extraction processing may be implemented by a convolutional neural network (CNN). For example, the first image may be directly input into the CNN, and the CNN calculates and outputs the first defect feature of each defect in the first image. In another optional embodiment, feature extraction processing may alternatively be implemented by other computing modules or feature extractors. For example, a convolution operation may be performed on the first image, and a result of the operation may be used as the defect features of the first image. It should be noted that there may be other manners of feature extraction processing, which are not limited in the embodiment of the present disclosure.

In step B, the target defect is selected from the plurality of defects by comparing each of the first defect features acquired by feature extraction with a second defect feature.

In the embodiment of the present disclosure, the processing device may compare each of the first defect features acquired by feature extraction with the second defect feature, and select the target defect from the plurality of defects. The second defect feature indicates defect type information of the defect of the specified type.

It should be noted that the second defect feature is acquired in advance. For example, a plurality of reference images including the defect of the specified type may be selected in advance from a large number of images acquired by the image acquisition device in the AOI system, and feature extraction is performed on the defect of the specified type in the plurality of images. In the case that an average operation is performed on the defect feature acquired by feature extraction, an acquired result may be used as the second defect feature. In this way, in the case that the processing device acquires the first defect feature of each defect by feature extraction, the first defect feature is directly compared with the second defect feature, such that the target defect can be selected from the plurality of defects.

In the present disclosure, there are a plurality of artificially specified types for defects. In the case that feature extraction is performed on different types of defects, acquired defect features are also different. In view of this, the number of second defect features is plural, and the plurality of second defect features are in a one-to-one correspondence with the plurality of types of defects. Moreover, the number of first defect features acquired upon feature extraction is performed on the plurality of defects in the first image is also plural. Therefore, in the case that each of the first defect features is sequentially compared with each second defect feature, a defect with the specified defect type can be selected from the plurality of defects.

As an example, step B above may include the following steps.

In step B1, a similarity between each of the first defect features and the second defect feature is determined.

In the embodiment of the present disclosure, upon determining the first defect features of the plurality of defects, the processing device may determine the similarity between each first defect feature and the second defect feature.

For example, the processing device may use a similarity calculation formula to calculate the similarity between each first defect feature and the second defect feature.

In step B2, whether the similarity between each first defect feature and the second defect feature is greater than a similarity threshold is determined.

In the embodiment of the present disclosure, upon determining the similarity between each first defect feature and the second defect feature, the processing device can detect whether the similarity of each first defect feature and the second defect feature is greater than the similarity threshold.

For example, when the processing device determines that a similarity between one of the first defect features and the second defect feature is greater than the similarity threshold, step B3 is performed; when the processing device determines that a similarity between one of the first defect features and a second defect feature is not greater than the similarity threshold, step B4 is performed.

In step B3, a defect corresponding to a first defect feature with a similarity greater than the similarity threshold is determined as the target defect.

In the embodiment of the present disclosure, in response to determining that the similarity between one of the first defect features and the second defect feature is greater than the similarity threshold, the processing device may determine the defect corresponding to the first defect feature as the target defect.

In step B4, a defect corresponding to a first defect feature with a similarity not greater than the similarity threshold is determined as another defect.

In the embodiment of the present disclosure, in response to determining that the similarity between one of the first defect features and the second defect feature is not greater than the similarity threshold, the processing device may determine the defect corresponding to the first defect feature as another defect different from the target defect in the plurality of defects.

Figure 5:
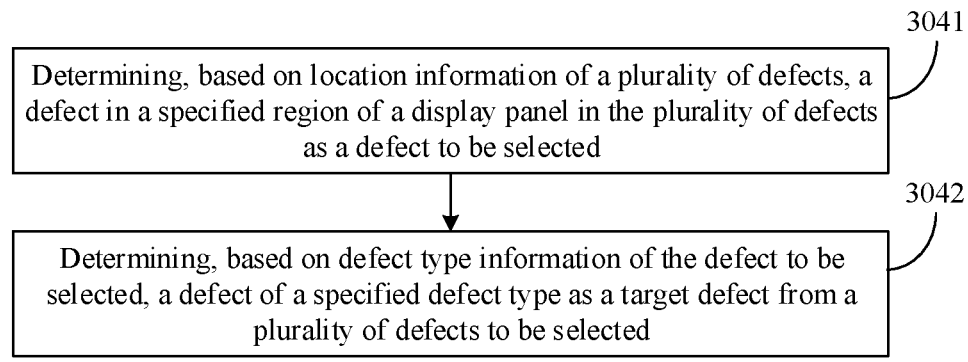
FIG. 5 is a flowchart of a method for selecting a target defect from a plurality of defects according to an embodiment of the present disclosure.

In a third example, the repair indication information of the defect includes the location information and the defect type information of the defect. For specific meanings of the location information of the defect, reference may be made to corresponding contents in the first example; and for specific meanings of the defect type information of the defect, reference may be made to corresponding contents in the second example. In this case, as illustrated in FIG. 5, FIG. 5 is a flowchart of a method for selecting a target defect from a plurality of defects according to an embodiment of the present disclosure. Step 304 may include the following steps.

In step 3041, based on the location information of the plurality of defects, a defect in a specified region of the display panel in the plurality of defects is determined as a defect to be selected.

For a specific procedure and principle of selecting the defect to be selected from the plurality of defects, refer to the corresponding contents of selecting the target defect from the plurality of defects in the first example. Details are not described in the embodiment of the present disclosure again. It should be noted that because the number of defects in the display panel is usually large, the number of defects to be selected from the plurality of defects is also plural.

In step 3042, a defect of a specified defect type is determined as the target defect from a plurality of defects to be selected and based on defect type information of the defect to be selected.

For a specific procedure and principle of selecting the target defect from the plurality of defects to be selected, refer to the corresponding contents of selecting the target defect from the plurality of defects in the second example. Details are not described in the embodiment of the present disclosure again.

In the embodiment of the present disclosure, when a defect is outside the specified region, even in the case that a type of the defect is the specified defect type, a probability that the defect affects normal display of the display panel is low. When a type of a defect is not the specified defect type, even in the case that the defect is in the specified region, a probability that the defect affects normal display of the display panel is also low.

In the present disclosure, when the repair indication information of the defect includes the location information and the defect type information of the defect, a defect in the specified region and of the specified defect type may be used as the target defect. This reduces the number of the selected target defects, and further improves detection efficiency of the AOI system for the display panel. It can further ensure that a probability that the selected target defect needs to be repaired is higher, and a probability that other defects that are not selected need to be repaired is lower, to ensure that a yield of the display panels is high.

It should be noted that the above embodiment is schematically described by using the example in which preliminary selection is first performed based on the location information of the defect and then the second time of selection is performed based on the defect type information of the defect as an example. In other optional embodiments, preliminary selection may be first performed based on the defect type information of the defect, and then the second time of selection may be performed based on the location information of the defect. The embodiment of the present disclosure imposes no limitation thereto.

In step 305, a second image embodying the display panel is acquired.

In the embodiment of the present disclosure, the processing device may acquire the second image embodying the display panel by the image acquisition device. To facilitate subsequent operators to repair defects based on the repair reference image, the repair reference image is usually a color image. The repair reference image is acquired by capturing the second image, and therefore the second image is usually also a color image.

As an example, the image acquisition device may further include an optical camera for acquiring a color image. The processing device can acquire the second image by the optical camera. It should be noted that the first image and the second image embodying the display panel can be acquired at the same time, that is, step 305 and step 301 may be performed at the same time.

In step 306, the repair reference image is acquired by capturing, based on location information of the target defect, an image embodying the target defect from the second image.

In the embodiment of the present disclosure, upon acquiring the second image and the target defect, the processing device may capture the image embodying the target defect from the second image based on the location information of the target defect, wherein the image embodying the target defect is the repair reference image of the target defect. Subsequently, maintenance personnel can repair the target defect based on the repair reference image to improve the yield of the display panels.

It should be noted that a sequence of the steps of the method for acquiring images according to the embodiment of the present disclosure can be appropriately adjusted, and the steps can also be added or omitted according to the situation. Any method that can be easily figured out by a person skilled in the art within the technical scope of the present disclosure shall fall within the protection scope of the present disclosure. Therefore, details are not repeated herein.

In summary, in the method for acquiring images according to the embodiment of the present disclosure, the repair indication information of a plurality of defects in the display panel is acquired, the target defect is selected from the plurality of defects based on the repair indication information, and the repair reference image embodying the target defect is subsequently acquired. A repair reference image embodying all defects in the display panel does not need to be acquired, such that an AOI system has high detection efficiency for the display panel and ensuring a larger production capacity of the display panel. In addition, a probability that the target defect selected based on the repair indication information needs to be repaired is higher, and a probability that other defects that are not selected need to be repaired is lower. This effectively improves accuracy of the AOI system in acquiring the repair reference image and achieves a higher yield of the display panels.

Figure 6:
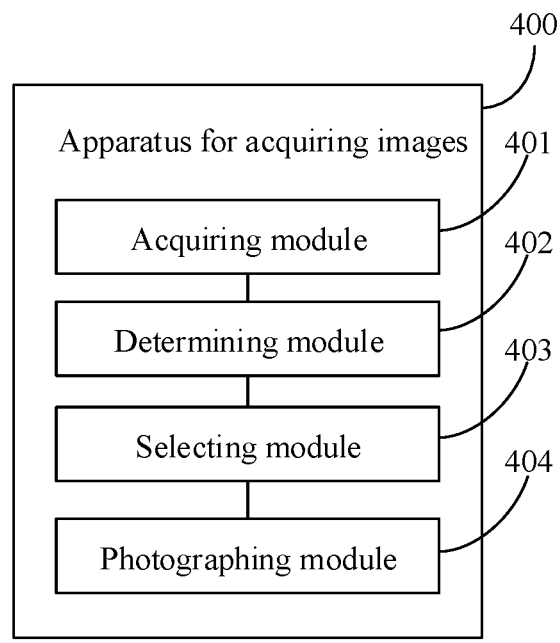
FIG. 6 is a block diagram of an apparatus for acquiring images according to an embodiment of the present disclosure.

An embodiment of the present disclosure further provides an apparatus for acquiring images. FIG. 6 is a block diagram of a structure of an apparatus 400 for acquiring images according to an embodiment of the present disclosure. The apparatus 400 may be integrated into the processing device 102 in the AOI System 100 shown in FIG. 1.

The apparatus 400 may include: an acquiring module 401, configured to acquire a first image embodying a display panel; a determining module 402, configured to determine repair indication information of a plurality of defects in the display panel in the first image, wherein the repair indication information indicates a degree of a repair demand for the defects; a selecting module 403, configured to select a target defect from the plurality of defects based on the repair indication information of the plurality of defects; and a photographing module 404, configured to acquire a repair reference image embodying the target defect by photographing the target defect in the display panel.

In summary, in the apparatus for acquiring images according to the embodiment of the present disclosure, the repair indication information of a plurality of defects in the display panel is acquired, the target defect is selected from the plurality of defects based on the repair indication information, and the repair reference image embodying the target defect is subsequently acquired. A repair reference image embodying all defects in the display panel does not need to be acquired, such that an AOI system has high detection efficiency for the display panel and ensuring a larger production capacity of the display panel. In addition, a probability that the target defect selected based on the repair indication information needs to be repaired is higher, and a probability that other defects that are not selected need to be repaired is lower. This effectively improves accuracy of the AOI system in acquiring the repair reference image and ensures a higher yield of the display panels.

Optionally, the repair indication information includes location information. The selecting module 403 is configured to determine a defect in a specified region of the display panel as the target defect based on the location information of the plurality of defects.

Optionally, the specified region includes at least one of a region, where a transistor is disposed, in the display panel, an intersection region of two signal cables, and a connection region of two connected electrodes.

Optionally, the repair indication information includes defect type information. The selecting module 403 is configured to determine a defect of a specified defect type as the target defect based on the defect type information of the plurality of defects.

Optionally, the selecting module 403 is configured to acquire first defect features of the plurality of defects by feature extraction on the plurality of defects in the first image, wherein the first defect features indicate the defect type information of the defects; selecting the target defect from the plurality of defects by comparing each of the first defect features acquired by feature extraction with a second defect feature, wherein the second defect feature indicates defect type information of the defect of the specified type.

Optionally, the selecting module 403 is configured to determine a similarity between each of the first defect features and the second defect feature; and determine a defect corresponding to a first defect feature with a similarity greater than a similarity threshold as the target defect.

Optionally, the repair indication information includes the location information and the defect type information. The selecting module 403 is configured to: determine, based on the location information of the plurality of defects, the defect in the specified region of the display panel in the plurality of defects as a defect to be selected; and determine, in the plurality of defects to be selected and based on defect type information of the defect to be selected, the defect of the specified defect type as the target defect.

Optionally, the photographing module 404 is configured to acquire a second image embodying the display panel; and acquire the repair reference image by capturing, based on location information of the target defect, an image embodying the target defect from the second image.

In summary, in the apparatus for acquiring images according to the embodiment of the present disclosure, the repair indication information of a plurality of defects in the display panel is acquired, the target defect is selected from the plurality of defects based on the repair indication information, and the repair reference image embodying the target defect is subsequently acquired. A repair reference image embodying all defects in the display panel does not need to be acquired, thereby ensuring that an AOI system has high detection efficiency for the display panel and ensuring a larger production capacity of the display panel. In addition, a probability that the target defect selected based on the repair indication information needs to be repaired is higher, and a probability that other defects that are not selected need to be repaired is lower. This effectively improves accuracy of the AOI system in acquiring the repair reference image and achieves a higher yield of the display panels.

Persons skilled in the art can clearly understand that, for convenience and brevity of description, reference may be made to corresponding processes in the above method embodiments for specific operating processes of the above-described apparatus, modules, and units. Details are not described herein again.

An embodiment of the present disclosure further provides a device for acquiring images. The device may include a processor, and a memory configured to store one or more instructions executable by the processor. The processor, when loading and executing the one or more instructions, is caused to perform the method for acquiring images shown in FIG. 2 or FIG. 3.

An embodiment of the present disclosure further provides a computer-readable storage medium storing one or more instructions therein. The computer-readable storage medium, when running on a processing component, causes the processing component to perform the method for acquiring images shown in FIG. 2 or FIG. 3.

In the present disclosure, the terms "first" and "second" are used for description only and are not intended to indicate or imply relative importance. The term "a plurality of" means two or more, unless otherwise clearly specified.

Persons of ordinary skill in the art may understand that some or all of the steps in the above embodiments may be performed by hardware or performed by a program instructing related hardware. The program may be stored in a computer-readable storage medium, for example, a read-only memory, a magnetic disk, an optical disk, or the like.

Described above are merely optional embodiments of the present disclosure and are not intended to limit the present disclosure. Any modification, equivalent replacement, improvement, or the like made shall fall within the protection scope of claims of the present disclosure, without departing from the spirit and principle of the present disclosure.

What is claimed is:

1. A method for acquiring images, comprising:
    acquiring a first image embodying a display panel;
    determining repair indication information of a plurality of defects in the display panel in the first image, wherein the repair indication information indicates a degree of a repair demand for the defects, and the repair indication information comprises defect type information;
    selecting a target defect from the plurality of defects based on the repair indication information of the plurality of defects; and
    acquiring a repair reference image embodying the target defect by photographing the target defect in the display panel;
    selecting the target defect from the plurality of defects based on the repair indication information of the plurality of defects comprises:
    acquiring first defect features by performing feature extraction on the plurality of defects, wherein the first defect features indicate the defect type information of the defects;
    determining a similarity between each of the first defect features and a second defect feature, wherein the second defect feature indicates defect type information of a defect of a specified type; and
    determining a defect corresponding to a first defect feature with a similarity greater than a similarity threshold as the target defect.

2. The method according to claim 1, wherein the repair indication information further comprises location information; and acquiring the first defect features by performing the feature extraction on the plurality of defects comprises:
    determining, based on the location information of the plurality of defects, defects in a specified region of the display panel in the plurality of defects as defects to be selected; and
    acquiring the first defect features by performing the feature extraction on the defects to be selected.

3. The method according to claim 2, wherein the specified region comprises at least one of a region, where a transistor is disposed, in the display panel, an intersection region of two signal cables, and a connection region of two connected electrodes.

4. The method according to claim 1, wherein acquiring the repair reference image embodying the target defect by photographing the target defect in the display panel comprises:
    acquiring a second image embodying the display panel; and
    acquiring the repair reference image by capturing, based on location information of the target defect, an image embodying the target defect from the second image.

5. A device for acquiring images, comprising:
    a processor; and
    a memory configured to store one or more instructions executable by the processor;
    wherein the processor, when loading and executing the one or more instructions, is caused to perform:
    acquiring a first image embodying a display panel;
    determining repair indication information of a plurality of defects in the display panel in the first image, wherein the repair indication information indicates a degree of a repair demand for the defects, and the repair indication information comprises defect type information;
    selecting a target defect from the plurality of defects based on the repair indication information of the plurality of defects; and
    acquiring a repair reference image embodying the target defect by photographing the target defect in the display panel;
    selecting the target defect from the plurality of defects based on the repair indication information of the plurality of defects comprises:
    acquiring first defect features by performing feature extraction on the plurality of defects, wherein the first defect features indicate the defect type information of the defects;
    determining a similarity between each of the first defect features and a second defect feature, wherein the second defect feature indicates defect type information of a defect of a specified type; and
    determining a defect corresponding to a first defect feature with a similarity greater than a similarity threshold as the target defect.

6. The device according to claim 5, wherein the repair indication information further comprises location information, and the processor, when loading and executing the one or more instructions, is caused to perform:
    determining, based on the location information of the plurality of defects, defects in a specified region of the display panel in the plurality of defects as defects to be selected; and acquiring the first defect features by performing the feature extraction on the defects to be selected.

7. The device according to claim 6, wherein the specified region comprises at least one of a region, where a transistor is disposed, in the display panel, an intersection region of two signal cables, and a connection region of two connected electrodes.

8. The device according to claim 5, wherein the processor, when loading and executing the one or more instructions, is caused to perform:
    acquiring a second image embodying the display panel; and
    acquiring the repair reference image by capturing, based on location information of the target defect, an image embodying the target defect from the second image.

9. A non-transitory computer-readable storage medium storing one or more instructions therein, wherein the computer-readable storage medium, when running on a processing component, causes the processing component to perform:
    acquiring a first image embodying a display panel;
    determining repair indication information of a plurality of defects in the display panel in the first image, wherein the repair indication information indicates a degree of a repair demand for the defects, and the repair indication information comprises defect type information;
    selecting a target defect from the plurality of defects based on the repair indication information of the plurality of defects; and
    acquiring a repair reference image embodying the target defect by photographing the target defect in the display panel;
    selecting the target defect from the plurality of defects based on the repair indication information of the plurality of defects comprises:
    acquiring first defect features by performing feature extraction on the plurality of defects, wherein the first defect features indicate the defect type information of the defects;
    determining a similarity between each of the first defect features and a second defect feature, wherein the second defect feature indicates defect type information of a defect of a specified type; and
    determining a defect corresponding to a first defect feature with a similarity greater than a similarity threshold as the target defect.

* * * * *